(12) United States Patent
Lee

(10) Patent No.: US 11,524,670 B2
(45) Date of Patent: Dec. 13, 2022

(54) CONTROL DEVICE FOR VEHICLE AND CONTROL METHOD FOR VEHICLE

(71) Applicants: JATCO Ltd, Fuji (JP); NISSAN MOTOR CO., LTD., Yokohama (JP)

(72) Inventor: Jonghwan Lee, Atsugi (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 188 days.

(21) Appl. No.: 16/638,922

(22) PCT Filed: Aug. 6, 2018

(86) PCT No.: PCT/JP2018/029423
§ 371 (c)(1),
(2) Date: Feb. 13, 2020

(87) PCT Pub. No.: WO2019/044397
PCT Pub. Date: Mar. 7, 2019

(65) Prior Publication Data
US 2020/0223420 A1 Jul. 16, 2020

(30) Foreign Application Priority Data
Aug. 28, 2017 (JP) .............................. JP2017-163536

(51) Int. Cl.
*B60K 6/485* (2007.10)
*B60W 10/08* (2006.01)
(Continued)

(52) U.S. Cl.
CPC ............ *B60W 10/08* (2013.01); *B60W 20/00* (2013.01); *B60K 6/485* (2013.01); *B60K 6/547* (2013.01);
(Continued)

(58) Field of Classification Search
CPC .......... B60W 10/08; B60W 2710/083; B60W 2050/0042; B60W 20/15;
(Continued)

(56) References Cited

U.S. PATENT DOCUMENTS 6,244,368 B1 * 6/2001 Ando ..................... B60K 6/543
180/65.25
9,896,084 B2 * 2/2018 Iwase .................... B60W 20/40
(Continued)

FOREIGN PATENT DOCUMENTS

JP 2014-4870 A 1/2014
WO WO-2016/013238 A1 1/2016

*Primary Examiner* — Timothy Hannon
*Assistant Examiner* — Farhana Pervin
(74) *Attorney, Agent, or Firm* — Foley & Lardner LLP

(57) ABSTRACT

The controller forms a control device for a vehicle with which torque generated in an engine and a motor generator is transmissible to a continuously variable transmission in accordance with a driving force request from a driver. The controller includes an engine controller forming a motor control unit adapted to control an output of the motor generator in accordance with the driving force request, and a transmission controller forming a transmission capacity control unit adapted to control a transmitted torque capacity of the continuously variable transmission, and, in a case where motor assistance is performed and when stability of the transmitted torque capacity of the continuously variable transmission is detected, performs the motor assistance.

6 Claims, 4 Drawing Sheets

(51) Int. Cl.
*B60W 20/00* (2016.01)
*B60K 6/547* (2007.10)

(52) U.S. Cl.
CPC ... *B60W 2540/10* (2013.01); *B60W 2710/081* (2013.01); *B60W 2710/083* (2013.01); *B60Y 2200/92* (2013.01)

(58) Field of Classification Search
CPC ......... B60W 2710/1083; B60W 20/00; B60W 2510/0241; B60W 2510/025; B60K 6/485
See application file for complete search history.

(56) References Cited

U.S. PATENT DOCUMENTS

| | | | | |
|---|---|---|---|---|
| 2007/0119640 | A1* | 5/2007 | Ito | B60W 20/00 180/65.27 |
| 2007/0246275 | A1* | 10/2007 | Dreibholz | B60L 15/2054 180/65.25 |
| 2012/0109438 | A1* | 5/2012 | Akebono | B60W 10/08 701/22 |
| 2013/0274979 | A1* | 10/2013 | Allgaier | B60W 10/06 701/22 |
| 2015/0148190 | A1 | 5/2015 | Mori | |
| 2017/0203750 | A1 | 7/2017 | Kawamoto | |

\* cited by examiner

CONTROL DEVICE FOR VEHICLE AND CONTROL METHOD FOR VEHICLE

TECHNICAL FIELD

The present invention relates to a control device for a vehicle and a control method for a vehicle.

BACKGROUND ART

WO2016/013238 discloses a technique of, in a case of performing motor assistance, increasing secondary pulley pressure in consideration with variation in motor torque, increasing a transmitted torque capacity of a continuously variable transmission, and then increasing the motor torque.

SUMMARY OF INVENTION

Regarding the secondary pulley pressure, actual pressure may overshoot or undershoot target pressure. When the actual pressure undershoots the target pressure, the transmitted torque capacity of the continuously variable transmission is decreased, and there is a possibility that slippage occurs in the continuously variable transmission.

The present invention is achieved in consideration with such a problem, and an object of the present invention is to provide a control device for a vehicle and a control method for a vehicle with which, in a case of increasing an output of a motor on the basis of a driving force request, occurrence of slippage in a power transmission portion can be prevented.

A control device for a vehicle according to a certain aspect of the present invention is a control device for the vehicle with which torque generated in an engine and a motor is transmissible to a power transmission portion in accordance with a driving force request from a driver. The control device includes a control unit including a motor control unit adapted to control an output of the motor in accordance with the driving force request, and a transmission capacity control unit adapted to control a transmission capacity of the power transmission portion on a basis of a target value, wherein in a case of increasing the output of the motor on a basis of the driving force request, the control unit increases the output of the motor when the transmission capacity of the power transmission portion is settled within a predetermined value of the target value and stability of the transmission capacity of the power transmission portion is detected.

According to another aspect of the present invention, a control method for a vehicle with which torque generated in an engine and a motor is transmissible to a power transmission portion in accordance with a driving force request from a driver is provided. The control method includes of controlling an output of the motor in accordance with the driving force request, and controlling a transmission capacity of the power transmission portion on a basis of a target value. In a case of increasing the output of the motor on a basis of the driving force request, the output of the motor is increased when the transmission capacity of the power transmission portion is settled within a predetermined value of the target value and stability of the transmission capacity of the power transmission portion is detected.

According to these aspects, even when the transmission capacity of the power transmission portion is decreased due to undershooting of actual pressure with respect to target pressure, the output of the motor is increased after the transmission capacity is settled within the predetermined value of the target value and the stability of the transmission capacity is detected. Therefore, in a case where the output of the motor is increased on the basis of the driving force request, it is possible to prevent occurrence of slippage in the power transmission portion.

DESCRIPTION OF EMBODIMENTS

Hereinafter, an embodiment of the present invention will be described with reference to the attached drawings.

Figure 1:
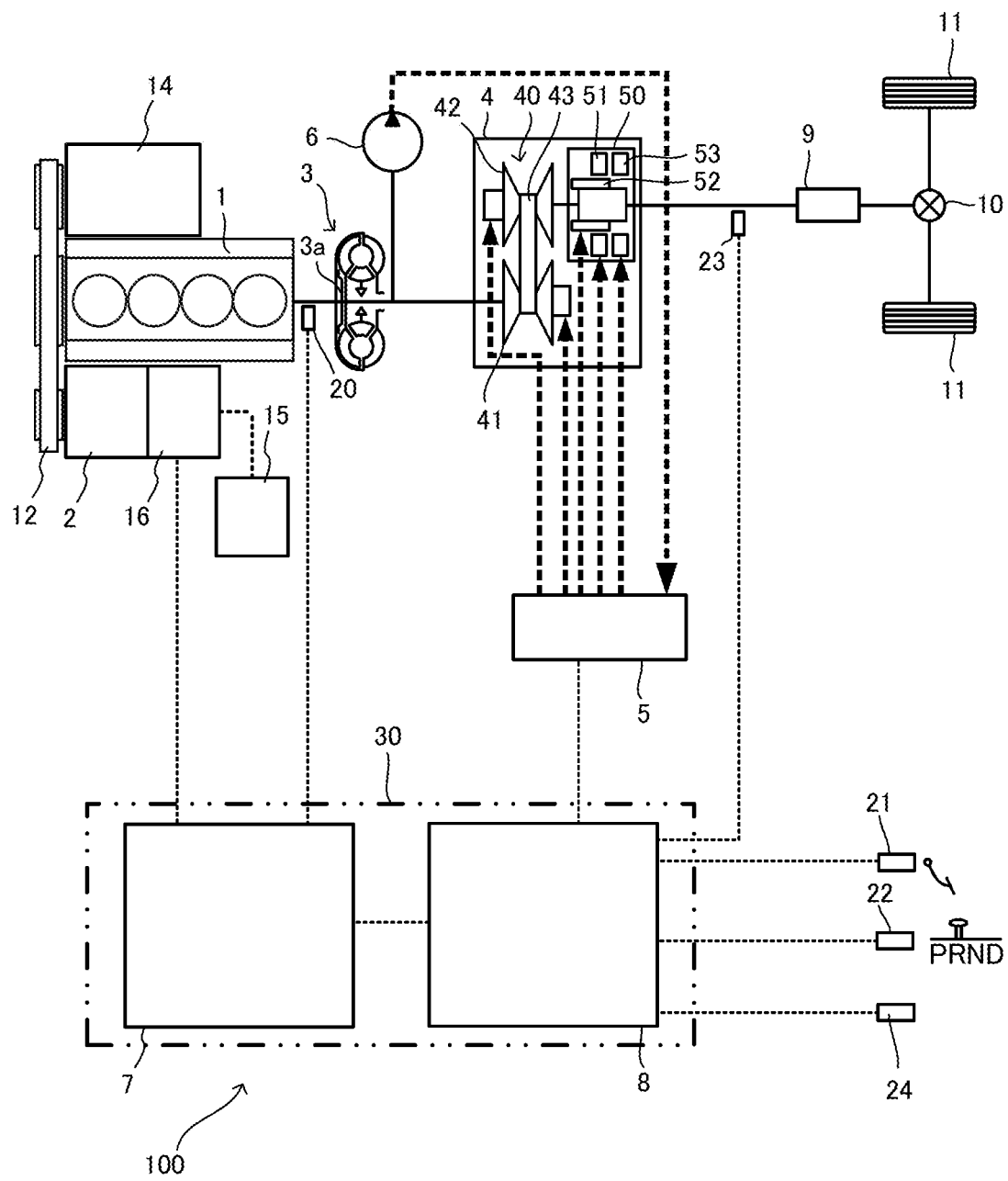
FIG. 1 is a schematic configuration diagram of a vehicle.

FIG. 1 is a schematic configuration diagram of a vehicle 100.

The vehicle 100 includes an engine 1, a motor generator 2, a torque converter 3, a transmission 4, a hydraulic control circuit 5, an oil pump 6, an engine controller 7, and a transmission controller 8. In the vehicle 100, torque generated in the engine 1 (hereinafter, referred to as the engine torque Te) is transmitted to vehicle wheels 11 through the torque converter 3, the transmission 4, a final reduction device 9, and a differential device 10.

The vehicle 100 is formed as a hybrid vehicle having the engine 1 and the motor generator 2 as a driving source. In the vehicle 100, it is possible to perform motor assistance to transmit torque generated in the motor generator 2 (hereinafter, referred to as the motor torque Tm) to an output shaft of the engine 1 via a belt 12, etc. At the time of the motor assistance, the engine torque Te and the motor torque Tm are transmitted to the vehicle wheels 11.

The engine 1 transmits the generated engine torque Te to the vehicle wheels 11 so that the vehicle 100 travels, and is capable of transmitting part of the engine torque Te to an air conditioner compressor 14 and the motor generator 2 via the belt 12, etc., so that these can be driven.

The motor generator 2 has a function as an electric motor to be driven and rotated upon receiving supply of electric power from a battery 15, and a function as a power generator to be rotated by external force to generate electric power. The motor generator 2 is connected to the battery 15 via an inverter 16. In a case where the motor assistance is performed, the motor generator 2 functions as the electric motor. In a case where the motor generator 2 is driven by the engine 1 or in a case where regeneration control is performed, the motor generator 2 functions as the power generator.

The torque converter 3 has a lock-up clutch 3a. When the lock-up clutch 3a is completely engaged, an input shaft and an output shaft of the torque converter 3 are directly connected, and the input shaft and the output shaft are rotated at the same speed. The lock-up clutch 3a forms a friction engaging element provided in a power transmission route connecting the driving source formed by the engine 1 and the motor generator 2 and the transmission 4. In the power transmission route, the motor generator 2, the engine 1, and the transmission 4 are arranged in this order.

The transmission 4 includes a continuously variable transmission 40 and a sub-transmission mechanism 50.

The continuously variable transmission 40 includes a primary pulley 41, a secondary pulley 42, and a belt 43. In the continuously variable transmission 40, by controlling oil pressure supplied to the primary pulley 41 (hereinafter, referred to as the primary pulley pressure Ppri) and oil pressure supplied to the secondary pulley 42 (hereinafter, referred to as the secondary pulley pressure Psec), a contact radius between each of the pulleys 41, 42 and the belt 43 is changed, so that a speed ratio is changed.

In the continuously variable transmission 40, a transmitted torque capacity (transmission capacity) is controlled so that no belt slippage occurs. In the present embodiment, the transmitted torque capacity is controlled by controlling the secondary pulley pressure Psec, and the transmitted torque capacity is increased according to an increase in the secondary pulley pressure Psec. Therefore, the transmitted torque capacity is variable by the secondary pulley pressure Psec. The continuously variable transmission 40 forms a power transmission portion. Specifically, the power transmission portion may be understood to be formed by the belt 43.

The sub-transmission mechanism 50 is a stepped automatic transmission mechanism having two forward gear positions and one reverse gear position. The sub-transmission mechanism 50 includes a Ravigneaux planetary gear mechanism in which two carriers of planetary gears are coupled, and a Low brake 51, a High clutch 52, and a Rev brake 53 serving as plural friction engaging elements connected to plural rotating elements forming the Ravigneaux planetary gear mechanism and adapted to change a linkage state of those. By adjusting oil pressure supplied to these friction engaging elements and changing an engaged/disengaged state, the gear position of the sub-transmission mechanism 50 is changed.

Regarding the transmission 4, by changing a speed ratio of the continuously variable transmission 40 and a speed ratio of the sub-transmission mechanism 50, an overall speed ratio of the transmission 4 is changed.

The hydraulic control circuit 5 is formed by plural flow passages and plural hydraulic control valves. The hydraulic control circuit 5 controls the plural hydraulic control valves on the basis of shift control signals from the transmission controller 8, and switches a supply route of the oil pressure. The hydraulic control circuit 5 also adjusts required line pressure PL from the oil pressure generated in the oil pump 6 on the basis of the shift control signals from the transmission controller 8, and supplies this to portions of the continuously variable transmission 40, the sub-transmission mechanism 50, and the torque converter 3. In the present embodiment, the secondary pulley pressure Psec in the continuously variable transmission 40 is equal to the line pressure PL.

A signal from an engine rotation speed sensor 20 adapted to detect engine rotation speed Ne, a signal from an accelerator pedal opening sensor 21 adapted to detect an accelerator pedal opening APO, a signal from an inhibitor switch 22 adapted to detect a position of a shift lever, a signal from a vehicle sensor 23 adapted to detect vehicle speed VSP, a signal from an oil temperature sensor 24 adapted to detect an oil temperature of the transmission 4, signals regarding the engine torque Te and the motor torque Tm from the engine controller 7 adapted to conduct control of the engine 1 and the motor generator 2, etc. are inputted to the transmission controller 8.

Regarding the secondary pulley pressure Psec, actual pressure Psec_A may overshoot or undershoot target pressure Psec_T. When the actual pressure Psec_A undershoots the target pressure Psec_T, the transmitted torque capacity is decreased, and there is a concern that slippage occurs in the continuously variable transmission 40, specifically, in the belt 43.

In consideration with such a circumstance, a controller 30 performs control to be described next in the present embodiment.

Figure 2:
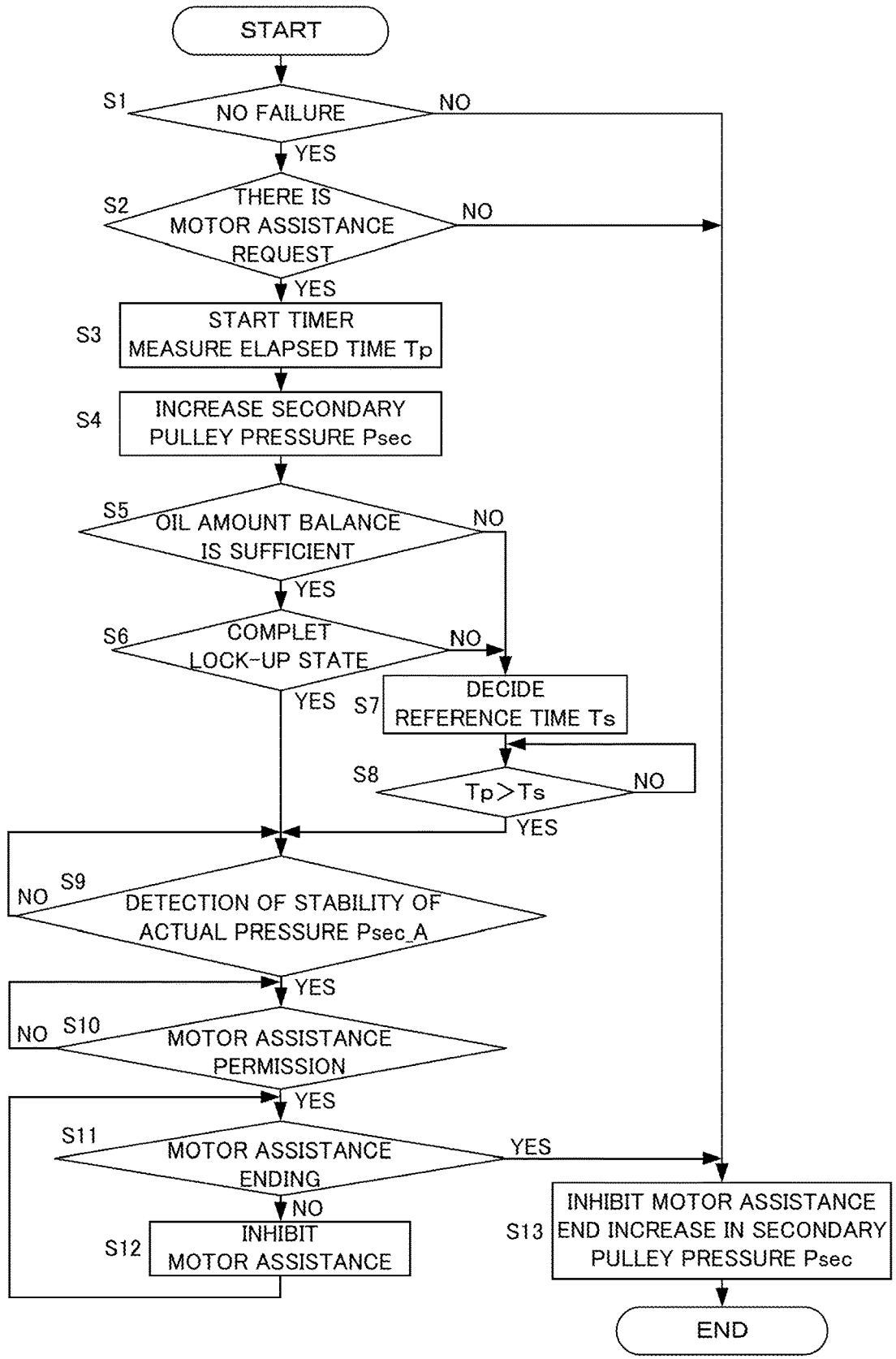
FIG. 2 is a diagram showing an example of control to be performed in an embodiment in a flowchart.

FIG. 2 is a diagram showing an example of the control to be performed by the controller 30 in a flowchart. In order to execute processing of the present flowchart, the controller 30 has a control unit. In the present flowchart, processing of Step S10 and Step S12 are specifically performed by the engine controller 7, and the other processing is specifically performed by the transmission controller 8.

In Step S1, the controller 30 determines whether or not there is no failure in the motor generator 2 and the continuously variable transmission 40, that is, whether or not these are normal. Whether or not there is no failure in the motor generator 2 can be determined on the basis of failure information acquired from the engine controller 7. In Step S1, whether or not there is no failure in the vehicle 100 may be determined. When YES determination is provided in Step S1, the processing is advanced to Step S2.

In Step S2, the controller 30 determines whether or not there is a motor assistance request. The motor assistance request is a request to use an output of the engine 1 and an output of the motor generator 2 as driving force, the request to be generated in a case where a motor assistance condition is satisfied. The driving force is specifically vehicle driving force.

The motor assistance condition includes, for example, a state that an operation point defined by a driving state of the vehicle including the accelerator pedal opening APO and the vehicle speed VSP is within a motor assistance region set in advance. Satisfaction/non-satisfaction of such a motor assistance condition is changed in accordance with a driving force request from a driver. Specifically, when the motor assistance condition is satisfied, the torque generated in the engine 1 and the motor generator 2 is transmitted to the continuously variable transmission 40 in accordance with the driving force request from the driver.

The determination of Step S2 can be performed by the transmission controller 8, and information of the motor assistance request can be inputted to the transmission controller 8 from the engine controller 7. When YES determination is provided in Step S2, the processing is advanced to Step S3.

In Step S3, the controller 30 starts a timer. Thereby, an elapsed time Tp after the motor assistance request is generated is measured.

In Step S4, the controller 30 increases the secondary pulley pressure Psec. Thereby, the transmitted torque capacity of the continuously variable transmission 40 is increased. The secondary pulley pressure Psec is increased for ensuring the transmitted torque capacity sufficient for the motor assistance, that is, the transmitted torque capacity with which no belt slippage occurs.

In Step S5, the controller 30 determines whether or not an oil amount balance is sufficient. The oil amount balance is an oil amount balance regarding oil that generates the secondary pulley pressure Psec (relationship between an oil amount required for generating the required secondary pulley pressure Psec and an oil amount that the oil pump 6 can supply), and depends on the oil temperature of the transmission 4, the engine rotation speed Ne, and deterioration of the oil. Specifically, the oil amount balance is decreased more as the oil temperature of the transmission 4 is higher. The oil amount balance is decreased more as the engine rotation speed Ne is lower or the oil is deteriorated more.

Whether or not the oil amount balance is sufficient can be determined on the basis of, for example, whether or not an operation point defined by a driving state of the vehicle including the oil temperature of the transmission 4, the engine rotation speed Ne, and the total travel distance is within an oil amount balance sufficiency region set in advance. The oil amount balance regarding the oil that generates the secondary pulley pressure Psec can be, for example, an oil amount balance in the oil pump 6 adapted to supply the oil.

When YES determination is provided in Step S5, the processing is advanced to Step S6. When NO determination is provided in Step S5, it is judged that the oil amount balance is insufficient, that is, the required oil amount is not ensured, and the processing is advanced to Step S7.

In Step S6, the controller 30 determines whether or not the lock-up clutch 3a is in a complete lock-up state, that is, a completely engaged state. Whether or not the lock-up clutch is in a complete lock-up state can be determined on the basis of, for example, whether or not differential rotation of the lock-up clutch 3a is zero. In a case where NO determination is provided in Step S6, the processing is advanced to Step S7.

In Step S7, the controller 30 decides a reference time Ts. The reference time Ts is a time serving as a reference to start the motor assistance. When the elapsed time Tp exceeds the reference time Ts, the motor assistance is started.

Figure 3A:
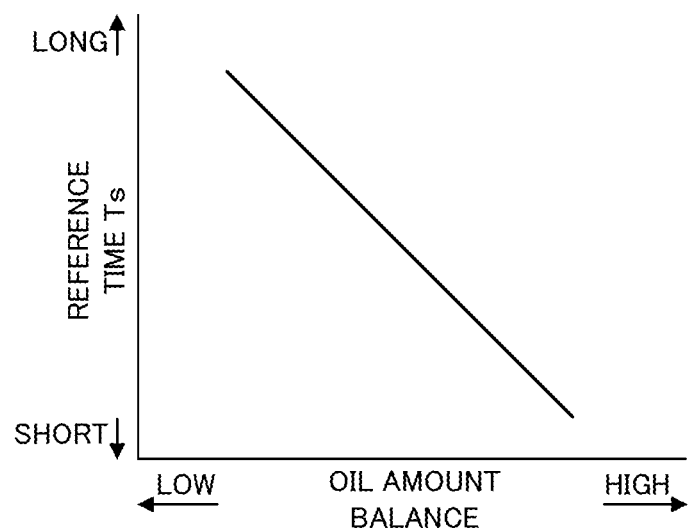
FIG. 3A is a diagram showing a relationship between a reference time and an oil amount balance.
Figure 3B:
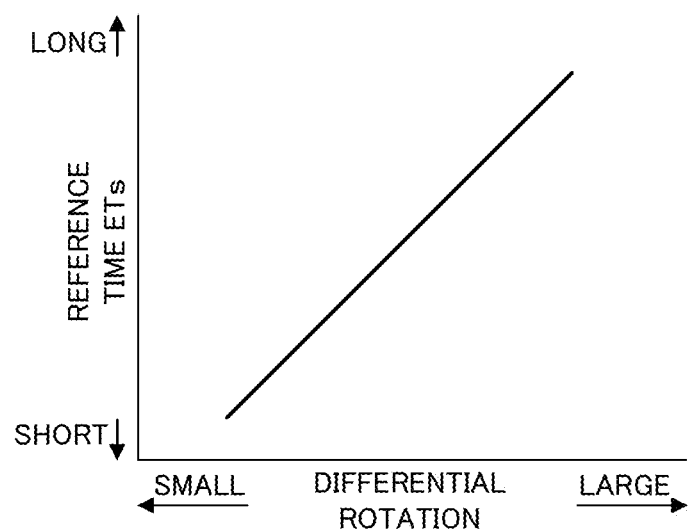
FIG. 3B is a diagram showing a relationship between the reference time and differential rotation of a lock-up clutch.

FIG. 3A is a diagram showing a relationship between the reference time Ts and the oil amount balance. FIG. 3B is a diagram showing a relationship between the reference time Ts and the differential rotation of the lock-up clutch 3a. FIG. 3A shows a change in the reference time Ts in accordance with the oil amount balance as a tendency, and FIG. 3B shows a change in the reference time Ts in accordance with the differential rotation of the lock-up clutch 3a as a tendency.

As shown in FIG. 3A, the reference time Ts is specifically set to be longer as the oil amount balance is lower (judging that the required oil amount is not ensured). The state where "the oil amount balance is lower" is a state where the required oil amount is less ensured in comparison to the state where "the oil amount balance is higher". As shown in FIG. 3B, the reference time Ts is set to be longer as the differential rotation of the lock-up clutch 3a is larger.

That is, the reference time Ts is variable in accordance with the oil amount balance and the differential rotation of the lock-up clutch 3a. The reference time Ts can be set in advance by, for example, map data, etc. The reference time Ts may be, for example, a fixed value. However, in this case, the reference time Ts can be longer than necessary depending on a situation.

Returning to FIG. 2, in Step S8, the controller 30 determines whether or not the elapsed time Tp exceeds the reference time Ts. When NO determination is provided in Step S8, the processing is returned back to Step S8. When YES determination is provided in Step S8, the processing is advanced to Step S9.

That is, until YES determination is provided in Step S8, the processing is not advanced to Step S9 and the following steps, and the motor assistance is not performed. Thus, start of the motor assistance is not decided. Meanwhile, when YES determination is provided in Step S8, the processing is advanced to Step S9 to get out of such a state. As a result, the start of the motor assistance is decided on the basis of the elapsed time Tp.

In a case where YES determination is provided in Step S6, the processing is also advanced to Step S9. In this case, the determination of Step S8 is not performed.

That is, in a case where the lock-up clutch 3a is engaged, the processing can be advanced to Step S9 irrespective of whether or not the elapsed time Tp exceeds the reference time Ts. As a result, in this case, the start of the motor assistance is decided irrespective of whether or not the elapsed time Tp exceeds the reference time Ts.

In Step S9, the controller 30 determines whether or not stability of the actual pressure Psec_A is detected. Whether or not stability of the actual pressure Psec_A is detected can be determined on the basis of, for example, whether or not the magnitude of a difference between the actual pressure Psec_A and the target pressure Psec_T is not more than a predetermined value a set in advance. Specifically speaking, stability of the secondary pulley pressure Psec is the stability of the actual pressure Psec_A as shown in the present step.

As described above, the processing of Step S9 is performed subsequently to YES determination of Step S6 or Step S8. Therefore, it can be said that deciding the start of the motor assistance is, in other words, permitting detection of the stability of the secondary pulley pressure Psec required for performing the motor assistance in the present embodiment. Deciding the start of the motor assistance includes not invalidating but validating a result of the detection in a case where the detection of the stability of the secondary pulley pressure Psec is already performed. When NO determination is provided in Step S9, the processing is returned back to Step S9. When YES determination is provided in Step S9, the processing is advanced to Step S10.

In Step S10, the controller 30 determines whether or not the motor assistance of the transmission 4 is permitted. A motor assistance permission condition includes, for example, a state that the transmitted torque capacity of the continuously variable transmission 40 is sufficient, therefore, a state that the actual pressure Psec_A is of the magnitude with which no belt slippage occurs. The motor assistance permission condition may further include conditions such as the oil temperature of the transmission 4, a state of the lock-up clutch 3a, a state of the sub-transmission mechanism 50, and a state of a range of the transmission 4.

The determination of Step S10 can be specifically performed by the engine controller 7. Information of motor assistance permission can be inputted to the engine controller 7 from the transmission controller 8 in a case where the motor assistance permission condition is satisfied. When NO determination is provided in Step S10, the processing is returned back to Step S10. When YES determination is provided in Step S10, the processing is advanced to Step S11.

In Step S11, the controller 30 performs motor assistance ending determination. The motor assistance ending determination can be determined on the basis of whether or not there is no motor assistance request. The fact that there is no motor assistance request can be determined by the transmission controller 8 on the basis of the information of the motor assistance request from the engine controller 7. When NO determination is provided in Step S11, the processing is advanced to Step S12.

In Step S12, the controller 30 performs the motor assistance. Thereby, the output of the motor generator 2 is controlled in accordance with the driving force request. In the motor assistance, specifically, the output of the motor generator 2 is increased on the basis of the driving force request. After Step S12, the processing is returned back to Step S11. When YES determination is provided in Step S11, the processing is advanced to Step S13. In a case where NO determination is provided in Step S1 or Step S2, the processing is also advanced to Step S13.

In Step S13, the controller 30 inhibits the motor assistance. The processing of Step S13 can be performed specifically by the transmission controller 8. Information that the motor assistance is inhibited can be inputted to the engine controller 7 from the transmission controller 8. Thereby, the engine controller 7 can end the motor assistance.

In Step S13, the controller 30 further ends the increase in the secondary pulley pressure Psec. Thereby, an increase in the transmitted torque capacity in accordance with the motor assistance is ended. The increase in the secondary pulley pressure Psec can be ended after the motor assistance is completely ended. After Step S13, the processing of the present flowchart is ended.

In a case where NO determination is provided in Step S10, the controller 30 may determine, for example, whether or not there is the motor assistance request, and the processing may be returned back to Step S10 in a case of YES determination or advanced to Step S13 in a case of NO determination. The same applies to Step S8 or Step S9.

Figure 4:
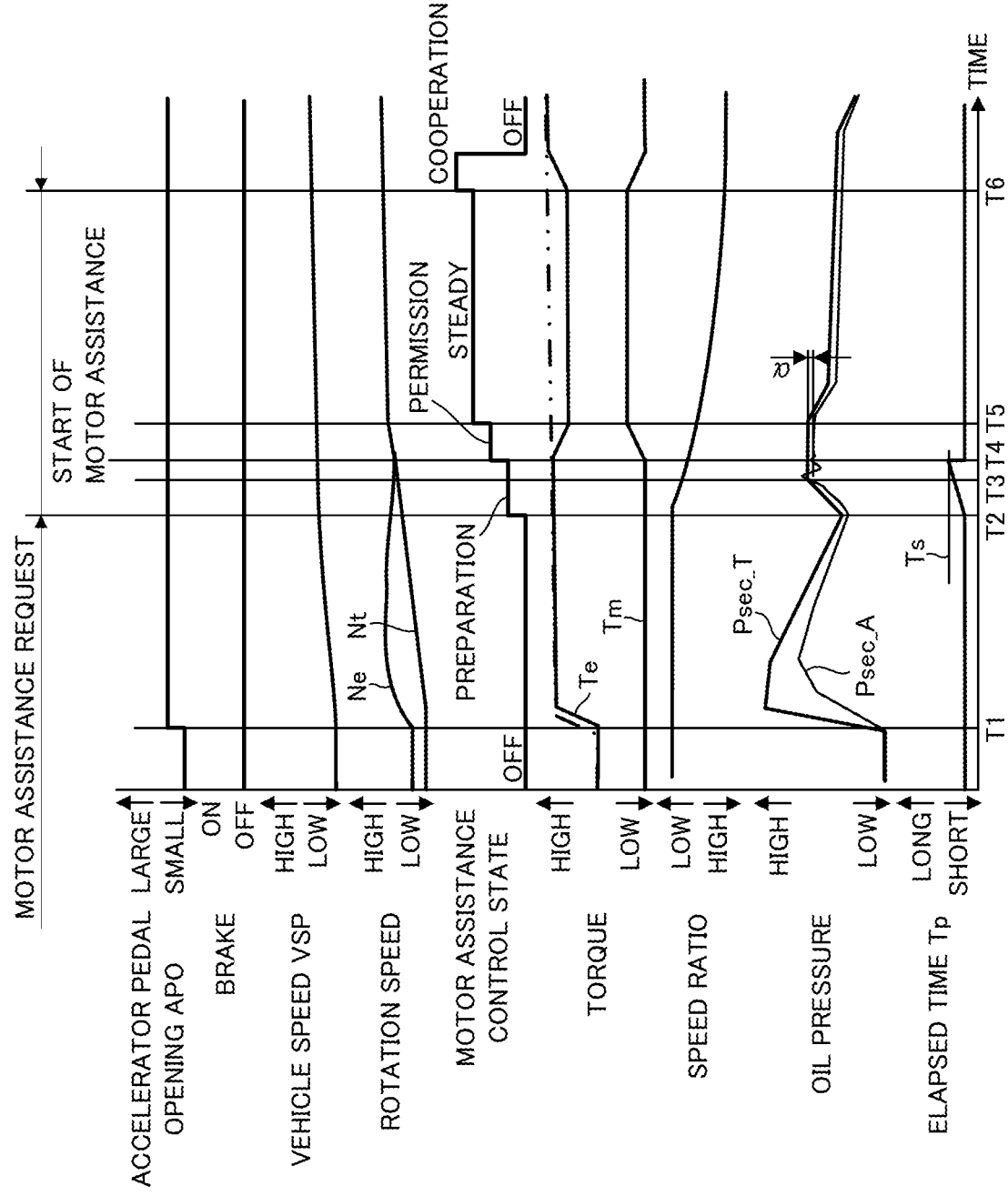
FIG. 4 is a diagram showing an example of a timing chart corresponding to the control to be performed in the embodiment.

FIG. 4 is a diagram showing an example of a timing chart corresponding to the flowchart shown in FIG. 2. At timing T1, the accelerator pedal opening APO is increased, and in accordance with this, the engine rotation speed Ne and the engine torque Te are increased.

At the timing T1, the lock-up clutch 3a is disengaged. Therefore, even when the engine rotation speed Ne is increased, turbine rotation speed Nt of the torque converter 3 is not immediately increased. An increase in the turbine rotation speed Nt is started when the engine torque Te becomes required torque shown by a double chain line.

At the timing T1 at which the engine torque Te is increased, the target pressure Psec_T is also increased. When the target pressure Psec_T is increased, the actual pressure Psec_A is also increased.

At timing T2, the motor assistance condition is satisfied, and the motor assistance request is generated. However, at the timing T2, the motor assistance permission condition is not satisfied. Regarding a motor assistance control state, "Preparation" indicates such a state.

At the timing T2, by increasing the target pressure Psec_T on the basis of the generated motor assistance request, the actual pressure Psec_A is increased. That is, the secondary pulley pressure Psec is increased. Thereby, the transmitted torque capacity of the continuously variable transmission 40 is increased in preparation for the motor assistance. The secondary pulley pressure Psec is increased so that the actual pressure Psec_A is gradually increased.

At the timing T2, as clear from the engine rotation speed Ne and the turbine rotation speed Nt, the lock-up clutch 3a is set in a slip state, and not engaged. Therefore, from the timing T2 and later, the elapsed time Tp is increased. The speed ratio of the continuously variable transmission 40 is gradually changed to the high side and decreased from the timing T2 and later.

At timing T3, the target pressure Psec_T becomes fixed. The actual pressure Psec_A overshoots and then undershoots the fixed target pressure Psec_T. Such variation in the actual pressure Psec_A is gradually settled.

At timing T4, the elapsed time Tp exceeds the reference time Ts. Further, at the timing T4, the magnitude of the difference between the actual pressure Psec_A and the target pressure Psec_T is not more than the predetermined value a, and the stability of the actual pressure Psec_A is detected. Regarding the motor assistance control state, "Permission" indicates such a state.

As a result, the motor assistance is started from the timing T4, and thereby, the motor torque Tm is increased. The motor torque Tm is gradually increased from the timing T4 and later. From the timing T4 and later, cooperative control of decreasing the engine torque Te is performed for an amount of an increase in the motor torque Tm. Thereby, even when the motor torque Tm is increased, the required torque can be maintained by the engine torque Te and the motor torque Tm.

From timing T5 and later, the motor torque Tm and the engine torque Te are brought into a steady state. Regarding the motor assistance control state, "Steady" indicates such a state.

At timing T6, the motor assistance request is eliminated. Therefore, from the timing T6 and later, in order to completely end the motor assistance, cooperative control of increasing the engine torque Te is started for an amount of a decrease in the motor torque Tm. Regarding the motor assistance control state, "Cooperation" indicates such a state. The motor torque Tm is gradually decreased from the timing T6 and later. When the motor assistance is completely ended, the increase in the actual pressure Psec_A in accordance with the motor assistance is completely ended.

Next, major actions and effects of the present embodiment will be described.

The controller 30 forms a control device for the vehicle 100 with which the torque generated in the engine 1 and the motor generator 2 is transmissible to the continuously variable transmission 40 in accordance with the driving force request from the driver. The controller 30 includes the engine controller 7 forming a motor control unit adapted to control the output of the motor generator 2 in accordance with the driving force request, and the transmission controller 8 forming a transmission capacity control unit adapted to control the transmitted torque capacity of the continuously variable transmission 40, and, in a case where the motor assistance is performed and when the stability of the transmitted torque capacity of the continuously variable transmission 40 is detected, performs the motor assistance.

According to such a configuration, even when the transmitted torque capacity of the continuously variable transmission 40 is decreased due to undershooting of the actual pressure Psec_A with respect to the target pressure Psec_T, the motor assistance is performed after the stability of the transmitted torque capacity is detected. Therefore, in a case where the motor assistance is performed on the basis of the driving force request, it is possible to prevent occurrence of slippage in the continuously variable transmission 40.

The controller 30 increases the transmitted torque capacity of the continuously variable transmission 40 on the basis of the motor assistance request. The controller 30 also decides the start of the motor assistance on the basis of the elapsed time Tp after the motor assistance request is generated.

According to such a configuration, upon increasing the transmitted torque capacity on the basis of the motor assistance request and then deciding the start of the motor assistance, the decision is made on the basis of the elapsed time Tp. Thus, the start of the motor assistance is easily decided.

The controller 30 decides the start of the motor assistance in a case where the elapsed time Tp exceeds the reference time Ts, and the reference time Ts is set to be longer as the oil amount balance is lower.

According to such a configuration, it is possible to prevent belt slippage by delaying the start of the motor assistance when the oil amount balance is low and it is difficult to increase the transmitted torque capacity.

In a case where the lock-up clutch 3a is not engaged, an unintended increase in rotation is caused by the motor assistance. As a result, an engagement shock or a decrease in durability can occur in the lock-up clutch 3a. Therefore, in a case where the lock-up clutch 3a is not engaged, it is thought that the motor assistance is inhibited.

In the present embodiment, the controller 30 decides the start of the motor assistance in a case where the elapsed time Tp exceeds the reference time Ts, and the reference time Ts is set to be longer as the differential rotation of the lock-up clutch 3a is larger.

According to such a configuration, there is no need for inhibiting the motor assistance by delaying the start of the motor assistance when the differential rotation of the lock-up clutch 3a is large, even in a case where the lock-up clutch 3a is not engaged. Therefore, it is possible to improve fuel consumption of the engine 1 more than a case where the motor assistance is inhibited.

In a case where the lock-up clutch 3a is engaged, the controller 30 decides the start of the motor assistance irrespective of the elapsed time Tp.

According to such a configuration, in a case where the lock-up clutch 3a is engaged, it is possible to start the motor assistance as soon as possible. Accordingly, it is possible to improve the fuel consumption of the engine 1.

The embodiment of the present invention is described above. However, the above embodiment only shows part of application examples of the present invention and does not intend to limit the technical scope of the present invention to the specific configurations of the above embodiment.

In the embodiment described above, the case where the vehicle 100 includes the continuously variable transmission 40 and the sub-transmission mechanism 50 is described. However, the vehicle 100 is required to include the continuously variable transmission 40, and for example, the vehicle may include a forward/reverse switching mechanism in place of the sub-transmission mechanism 50.

In the embodiment described above, the case where the controller 30 starts the motor assistance is described as an example. However, in place of such a case, for example, a case where the motor torque Tm is increased during the motor assistance may be taken as an object.

In the embodiment described above, the case where the controller 30 including the engine controller 7 and the transmission controller 8, that is, the plural controllers forms the control unit is described. However, the control unit may be realized by, for example, a single controller.

The present application claims a priority based on Japanese Patent Application No. 2017-163536 filed with the Japan Patent Office on Aug. 28, 2017, all the contents of which are hereby incorporated by reference.

The invention claimed is:

1. A control device for a vehicle with which torque generated in an engine and a motor is transmissible to a power transmission portion in accordance with a driving force request from a driver, the control device comprising:
   a controller including a motor controller configured to control an output of the motor in accordance with the driving force request, and a transmission capacity controller configured to control a transmission capacity of the power transmission portion on a basis of a target value, wherein
   in a case of increasing the output of the motor on a basis of the driving force request, the controller is configured to increase the output of the motor when the transmission capacity of the power transmission portion is settled within a predetermined value of the target value and stability of the transmission capacity of the power transmission portion is detected, and
   upon increasing the output of the motor, the controller:
   is configured to increase the transmission capacity of the power transmission portion on a basis of a motor assistance request serving as a request to use an output of the engine and the output of the motor as driving force; and
   is configured to decide start of an increase in the output of the motor on a basis of an elapsed time after the motor assistance request is generated and then increase the output of the motor when the stability of the transmission capacity of the power transmission portion is detected.

2. The control device for the vehicle according to claim 1, wherein
   the transmission capacity of the power transmission portion is variable by oil pressure,
   the controller is configured to decide the start of the increase in the output of the motor in a case where the elapsed time exceeds a reference time, and
   the reference time is set to be longer as a required oil amount regarding oil that generates the oil pressure is less ensured.

3. The control device for the vehicle according to claim 1, wherein
   the controller is configured to decide the start of the increase in the output of the motor in a case where the elapsed time exceeds a reference time, and
   the reference time is set to be longer as differential rotation of a friction engaging element provided in a power transmission route connecting the engine and the motor and the power transmission portion is larger.

4. The control device for the vehicle according to claim 1, wherein
   in a case where a friction engaging element provided in a power transmission route connecting the engine and the motor and the power transmission portion is engaged, the controller is configured to decide the start of the increase in the output of the motor irrespective of the elapsed time.

5. A control method for a vehicle with which torque generated in an engine and a motor is transmissible to a power transmission portion in accordance with a driving force request from a driver, the control method comprising:
   controlling an output of the motor in accordance with the driving force request; and
   controlling a transmission capacity of the power transmission portion on a basis of a target value, wherein
   in a case of increasing the output of the motor on a basis of the driving force request, the output of the motor is increased when the transmission capacity of the power transmission portion is settled within a predetermined value of the target value and stability of the transmission capacity of the power transmission portion is detected, and
   upon the output of the motor being increased:
   the transmission capacity of the power transmission portion is increased on a basis of a motor assistance request serving as a request to use an output of the engine and the output of the motor as driving force; and start of an increase in the output of the motor is decided on a basis of an elapsed time after the motor assistance request is generated and then the output of the motor is increased when the stability of the transmission capacity of the power transmission portion is detected.

6. A control device for a vehicle with which torque generated in an engine and a motor is transmissible to a power transmission portion in accordance with a driving force request from a driver, the control device comprising:

control means including motor control means for controlling an output of the motor in accordance with the driving force request, and transmission capacity control means for controlling a transmission capacity of the power transmission portion on a basis of a target value, wherein in a case of increasing the output of the motor on a basis of the driving force request, the control means increases the output of the motor when the transmission capacity of the power transmission portion is settled within a predetermined value of the target value and stability of the transmission capacity of the power transmission portion is detected, and upon increasing the output of the motor, the control means:

increases the transmission capacity of the power transmission portion on a basis of a motor assistance request serving as a request to use an output of the engine and the output of the motor as driving force; and decides start of an increase in the output of the motor on a basis of an elapsed time after the motor assistance request is generated and then increases the output of the motor when the stability of the transmission capacity of the power transmission portion is detected.

\* \* \* \* \*